Patented May 26, 1953

2,640,074

UNITED STATES PATENT OFFICE 2,640,074

PROCESS FOR SYNTHESIS OF HIGHER ALIPHATIC OXYGEN - CONTAINING COMPOUNDS

William F. Gresham and Arthur J. Hill, Jr., Wilmington, Del., assignors to E. I. du Pont de Nemours & Company, Wilmington, Del., a corporation of Delaware No Drawing. Application May 18, 1949, Serial No. 94,046

2 Claims. (Cl. 260—497)

This invention relates to a novel process for the synthesis of relatively high molecular weight aliphatic oxygen-containing compounds such as aliphatic alcohols containing from 9 to 21 carbon atoms per molecule. More particularly, the present invention relates to a process for preparing reaction products from butadiene, carbon monoxide, and hydrogen at very high pressures, under conditions such that, instead of simple carbonylation products, relatively high molecular weight oxygen-containing compounds are produced.

It has been disclosed heretofore that butadiene, like other olefinic hydrocarbons, undergoes reaction with carbon monoxide and hydrogen in the presence of hydrogenation catalysts at elevated temperatures and under pressures as high as 3,000 atmospheres or even higher to give oxygen-containing organic compounds (U. S. Patent 2,437,600). In the copending application S. N. 785,799, now U. S. Patent 2,517,383, which was filed November 13, 1947, it is disclosed that good yields of 5-carbon saturated monoaldehydes can be obtained by injecting butadiene into a heated mixture containing from 1 to 9 molar equivalents of carbon monoxide with 3 molar equivalents of hydrogen maintained at a temperature of 75° to 200° C. under a pressure of 500 to 1500 atmospheres in the presence of a hydrogenation catalyst, preferably a hydrogenation catalyst containing cobalt.

An object of this invention is to provide a process for the preparation of organic oxygen-containing compounds of relatively high molecular weight, such as saturated aliphatic monohydric alcohols containing from 9 to 21 carbon atoms per molecule, and esters thereof. Preparation of aldehydes which upon hydrogenation yield saturated aliphatic monohydric alcohols containing from 9 to 21 carbon atoms per molecule is also included as an object of this invention. A further object is to prepare esters which upon hydrolysis yield the said alcohols. Other objects of the invention will appear hereinafter.

It has been discovered in accordance with this invention that at pressures in excess of 1500 atmospheres, and more particularly at pressures within the range of 2,000 to 5,000 atmospheres the reaction between butadiene, carbon monoxide and hydrogen, in the presence of a liquid alkanoic acid medium containing a dissolved cobalt compound gives rise to the formation of relatively high molecular weight oxygen-containing organic compounds, rather than the simple 5-carbon aldehyde obtained from butadiene, carbon monoxide and hydrogen at relatively lower pressures. The present invention thus provides a process for preparing relatively high molecular reaction products by reacting butadiene with carbon monoxide and hydrogen at a reaction temperature within the range of 135° to 300° C. under a pressure within the range of 2,000 to 5,000 atmospheres in a liquid alkanoic acid medium in the presence of a cobalt compound dissolved in the said alkanoic acid, whereby a reaction product having an oxygen atom attached to an acyclic hydrocarbon radical is obtained, the number of carbon atoms in the said acyclic hydrocarbon radical being at least 9 and not greater than 21.

Any cobalt compound which is soluble in the alkanoic acid reaction medium may be employed as a catalyst in the practice of the invention. The nature of the radical attached to the cobalt in the said catalyst is relatively insignificant, it being sufficient that the cobalt be in a soluble form. Thus excellent results are obtained using cobalt salts of alkanoic acids such as cobalt acetate, cobalt propionate, cobalt stearate, etc. Other soluble cobalt compounds can be employed with equal effectiveness; included among these are cobalt naphthenate, cobalt carbonyl, cobalt hydrocarbonyl, and chelate compounds of cobalt. The quantity of catalyst employed should be sufficient to effect a reasonably rapid reaction rate, a suitable amount being about 0.2 to 10.0% by weight based upon the weight of cobalt per unit weight of alkanoic acid.

In general, it is preferred to employ carbon monoxide and hydrogen in substantially equimolar quantities. The use of unequal gas ratios (carbon monoxide/hydrogen from 3/1 to 1/2) is permissible but does not result in any improvement in yield over the yield obtained when an equimolar ratio of carbon monoxide/hydrogen is employed.

The quantity of alkanoic acid diluent employed is not highly critical but should be sufficient to dissolve the cobalt compound which is employed as catalyst. A suitable quantity of alkanoic acid diluent is about 0.5 to 5.0 mols per mol of butadiene.

The reaction temperature should be at least about 135° C. since polymerization of butadiene proceeds at a greater rate than carbonylation when a temperature below about 135° C. is employed. Very satisfactory results are obtained at temperatures of about 140° to 155° C. At relatively higher temperatures, i. e. about 200° C., it is frequently desirable to employ relatively short contact times since the reaction goes to completion in reaction time of only a few minutes at such elevated temperatures.

A characteristic feature of the invention is the use of these very high pressures to effect the formation of oxygenated organic compounds having an oxygen atom attached to a relatively long hydrocarbon chain. These reaction products may include aldehydes, alcohols, and esters having at least 9 carbon atoms in the radical attached to oxygen atom. Examples of such products include compounds of the formula $H(CH_2-CH=CH-CH_2)_n CHO$,
$H(CH_2-CH_2-CH_2-CH_2)_n CH_2OH$,
$H(CH_2-CH_2-CH_2-CH_2)_n CH_2O$ Acyl, etc.

$n$ being an integer having a value of at least 2. In the particular compounds just formulated an oxygen atom is attached to a radical having $5+4n$ carbon atoms. However, it is noteworthy that the reaction product is not limited to these particular compounds, but in fact is usually a rather complex mixture in which are present branched chain ingredients including alcohols in which the number of carbon atoms attached to oxygen is not equal to $5+4n$. In view of the complexity of the reaction, the applicants do not wish to be bound by any theory which may account for the results observed. Regardless of theory, the fact of the matter is that the reaction mixture obtained under the herein disclosed conditions from butadiene, carbon monoxide and hydrogen, especially at pressures in the range of about 2500 to 3000 atmospheres or higher, is made up largely of compounds in which an oxygen atom is attached to an acyclic hydrocarbon radical having at least 9 and not greater than 21 carbon atoms.

The invention is illustrated further by means of the following examples.

*Example 1.*—A mixture of 14 grams butadiene, 120 grams glacial acetic acid, and 0.5 gram cobalt acetate was charged into a silver-lined rocker tube and heated under about 2500 to 3000 atmospheres pressure with carbon monoxide and hydrogen (mol ratio 1/1) at 145° to 155° C. for 15 minutes. The excess acetic acid was distilled from the reaction product at a pressure of 1 mm., whereupon a residue containing 19.4 grams of mixed aldehydes, alcohols and their acetates was obtained. This crude product could not be distilled directly even at reduced pressure without decomposition and condensation to give high molecular weight tars. Evidently this was due in part to the presence of residual cobalt in the mixture. Hydrogenation of the mixture at 250° under 700 atmospheres pressure in benzene solution using a copper chromite catalyst gave a mixture of alcohols having a boiling range of 82° to 210° C. under a pressure of 3 mm. Analysis of the distilled alcohols from composited runs showed that the products contained chiefly aliphatic alcohols in the range $C_9$ to $C_{21}$. Differences between hydroxyl numbers (which varied from 260 to 240) and molecular weight determinations (228 to 367) indicated the presence of some higher molecular weight glycols.

*Example 2.*—A mixture consisting of 14 grams butadiene, 120 grams glacial acetic acid and 0.5 gram of cobaltous acetate was heated at a temperature of 160° to 162° for 30 minutes with carbon monoxide and hydrogen (mol ratio CO:H= 1:1) under a pressure of 1900 to 2000 atmospheres. No high-boiling distillable alcohols, esters or aldehydes, such as those obtained at 3000 atmospheres pressures, were produced.

It is to be understood that the foregoing examples are illustrative only and that numerous modifications of the invention will occur to those who are skilled in the art. For example, at least a minor portion of the alkanoic acid diluent may be replaced by a hydrocarbon diluent such as benzene. The diluent may, of course, be recovered and recycled as desired. Alkanoic acid recovered by hydrolysis of any ester which may be formed and hydrolyzed can be recycled and used again as a diluent for the reaction mixture. If desired, the aldehyde which evidently is produced as an intermediate can be separated out and hydrogenated to alcohol in a separate step. Any suitable method for recovering and recycling the catalyst may be used.

The saturated aliphatic alcohols produced in accordance with this invention are highly useful in the manufacture of alcohol-sulfate type detergents and other organic or inorganic esters. The acrylate and methacrylate esters of these alcohols are highly useful and are especially effective as lubricating oil additives. The aldehydes obtained by the process of this invention are readily converted to acids by oxidation with air, especially in the presence of conventional oxidation catalysts. These acids are useful for many industrial purposes, as substitutes for the common fatty acids.

We claim:

1. A process which comprises reacting butadiene with carbon monoxide and hydrogen at a reaction temperature within the range of 135° to 200° C. under 2,500 to 5,000 atmospheres pressure in a liquid alkanoic acid medium in the presence of a cobalt compound dissolved in the said alkanoic acid whereby a reaction product of the said butadiene, carbon monoxide and hydrogen is obtained, said reaction product having an oxygen atom attached to an acyclic hydrocarbon radical, the number of carbon atoms in the said acyclic hydrocarbon radical being at least 9 and not greater than 21.

2. A process which comprises reacting butadiene with carbon monoxide and hydrogen at a reaction temperaton within the range of 135° to 200° C. under 2,500 to 5,000 atmospheres pressure in an acetic acid medium in the presence of cobalt acetate dissolved in the said acetic acid whereby a reaction product of the said butadiene, carbon monoxide and hydrogen is obtained, said reaction product having an oxygen atom attached to an acyclic hydrocarbon radical where the number of carbon atoms in the said radical being at least 9 and not greater than 21.

WILLIAM F. GRESHAM.
ARTHUR J. HILL, JR.

References Cited in the file of this patent
UNITED STATES PATENTS

| Number | Name | Date |
|---|---|---|
| 2,402,133 | Gresham et al. | June 18, 1946 |
| 2,437,600 | Gresham et al. | Mar. 9, 1948 |
| 2,517,383 | Brooks | Aug. 1, 1950 |

OTHER REFERENCES

Willemart, Bull. Soc. de France, (5) 14, pp. 152–57 (1947).